(12) United States Patent
Herrod et al.

(10) Patent No.: US 7,567,812 B2
(45) Date of Patent: Jul. 28, 2009

(54) INDIRECT ASSET INVENTORY MANAGEMENT

(75) Inventors: Allan Herrod, Mission Viejo, CA (US);
Vikranth Katpally-Reddy, Foster City, CA (US); Tom Conticello, St. James, NY (US); Sudheer Vangati, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 440 days.

(21) Appl. No.: 11/191,637

(22) Filed: Jul. 28, 2005

(65) Prior Publication Data

US 2007/0025286 A1  Feb. 1, 2007

(51) Int. Cl.
*H04B 7/00* (2006.01)
*H04Q 7/22* (2006.01)

(52) U.S. Cl. .............. 455/456.5; 455/502; 370/328; 705/8; 707/10; 707/102; 713/1; 714/4; 717/116; 719/318

(58) Field of Classification Search .......... 455/406, 455/419, 502, 456.5; 370/401, 328; 717/116; 719/318; 705/8; 707/10, 102; 713/1; 714/4
See application file for complete search history.

(56) References Cited

U.S. PATENT DOCUMENTS

| | | | | |
|---|---|---|---|---|
| 5,673,306 A | * | 9/1997 | Amadon et al. | 455/406 |
| 7,035,270 B2 | * | 4/2006 | Moore et al. | 370/401 |
| 7,065,348 B1 | * | 6/2006 | Aoki | 455/419 |
| 2004/0015848 A1 | * | 1/2004 | Bystedt et al. | 717/116 |
| 2005/0022209 A1 | * | 1/2005 | Lieblich et al. | 719/318 |
| 2005/0034134 A1 | * | 2/2005 | Lieblich et al. | 719/318 |
| 2005/0091099 A1 | * | 4/2005 | Krueger et al. | 705/8 |
| 2006/0167891 A1 | * | 7/2006 | Blaisdell et al. | 707/10 |
| 2006/0253693 A1 | * | 11/2006 | Kanodia | 713/1 |
| 2007/0025286 A1 | * | 2/2007 | Herrod et al. | 370/328 |
| 2007/0049297 A1 | * | 3/2007 | Gopalan et al. | 455/456.5 |
| 2007/0275745 A1 | * | 11/2007 | Owen | 455/502 |
| 2008/0120327 A1 | * | 5/2008 | Bhat | 707/102 |
| 2008/0126831 A1 | * | 5/2008 | Downey et al. | 714/4 |

OTHER PUBLICATIONS

Ujiie, "A Performance Evaluation Method that Uses Simple Network Management Protocol for Radio Local Area Networks", Electronics and Communications in Japan, Part I, vol. 79, No. 10, Oct. 10, 1995, pp. 10-16.

* cited by examiner

*Primary Examiner*—William D Cumming (57) ABSTRACT

A method for receiving, on a first device connected to a network, a communication including information corresponding to a second device which is not connected to the network. The information is stored on the first device and transmitted to an enterprise management system for the network, wherein the information includes an indication that the information corresponds to the second device.

22 Claims, 4 Drawing Sheets

Indirect Monitoring - 100

Figure 4

INDIRECT ASSET INVENTORY MANAGEMENT

BACKGROUND INFORMATION

Wireless networks are deployed in a great number of industries such as retail environments, transportation and logistics, manufacturing, warehousing, etc. These wireless networks may include large numbers of mobile units, wireless switches, access points and other devices. The devices may be managed as part of an overall enterprise management system. However, this management depends on the mobile device being connected to the wireless network. There are additional devices which are important to the operation of the network, but do not have any connectivity to the network. Thus, the enterprise management system cannot manage these (or even maintain information) about these additional devices.

SUMMARY OF THE INVENTION

A method for receiving, on a first device connected to a network, a communication including information corresponding to a second device which is not connected to the network. The information is stored on the first device and transmitted to an enterprise management system for the network, wherein the information includes an indication that the information corresponds to the second device.

A device including a protocol to communicate with other network devices on a network and an enterprise management agent to receive information corresponding to a non-network device which is not connected to the network, store the information corresponding to the non-network device and transmit the stored information using the protocol to an enterprise management system on one of the other network devices.

Another method for receiving a communication from an agent residing on a network device, the communication including information corresponding to a non-network device which is not connected to the network and storing the information for the non-network device.

An enterprise management system having a receiving module to receive a communication from an agent residing on a network device, the communication including information corresponding to a non-network device which is not connected to the network and a storage module to store the information for the non-network device.

DETAILED DESCRIPTION

Figure 1:
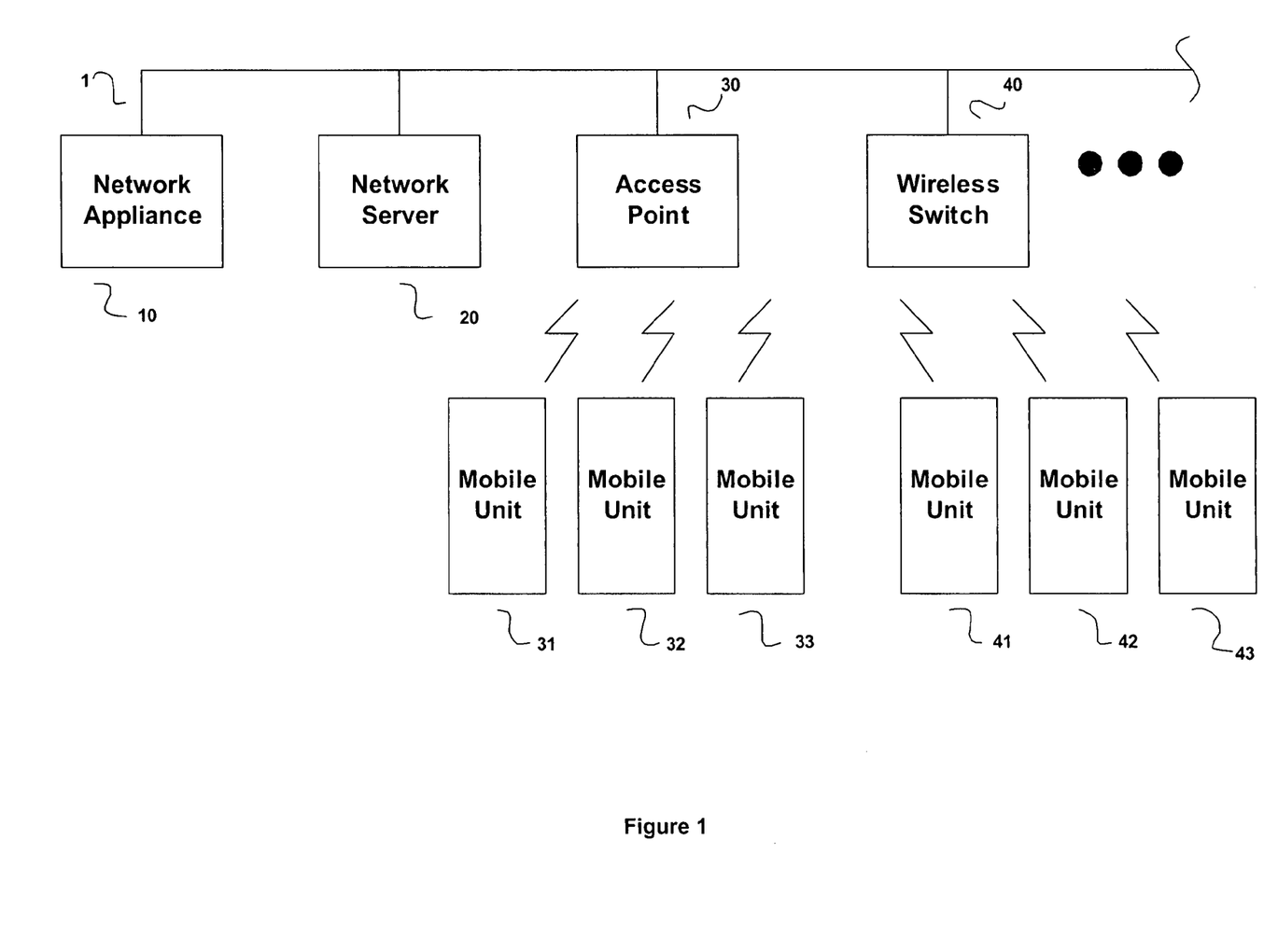
FIG. 1 shows an exemplary network which includes an enterprise management system for managing the devices on the network.

The present invention may be further understood with reference to the following description and the appended drawings, wherein like elements are provided with the same reference numerals. FIG. 1 shows an exemplary network 1 that includes an enterprise management system for managing the devices on the network. The network 1 includes a network appliance 10, a network server 20, an access point 30 and a wireless switch 40. Each of these devices are shown as interconnected via a wired portion of the network 1. However, those of skill in the art will understand that these devices may also be wirelessly connected to the network 1. In addition, network 1 may also include any number of additional network components and/or devices (not shown).

FIG. 1 also shows mobile units 31-33 wirelessly connected to the network 1 via the access point 30. The mobile units 31-33 may be any type of computing or processor based device such as desktop or laptop computers, personal digital assistants, mobile phones, pagers, scanners, etc. The mobile units 31-33 and access point 30 may operate within any type of wireless networking environment, e.g., Wireless Local Area Network ("WLAN"), Wireless Wide Area Network ("WWAN"), etc. Communication between the mobile units 31-33 and the access point 30 may be accomplished using any wireless protocol such as IEEE 802.11, Bluetooth, etc. Similarly, mobile units 41-43 are wirelessly connected to the network 1 via the wireless switch 40. Those of skill in the art will understand that the network 1 is only exemplary and that the exemplary embodiment of the present invention may be implemented on any network.

The owner of the above described exemplary network or any other network including wireless devices faces a variety of issues in operating and maintaining the network in its optimum state. Thus, the owner may implement an enterprise management system to manage some or all of the devices on the network 1. The enterprise management system may be a centralized management system for managing individual devices connected to the wireless network. The system may provide a series of services which allow a system administrator to both monitor and control the network 1 and the individual devices on the network.

Typically, the enterprise management system will reside on a network device such as the network appliance 10. However, those of skill in the art will understand that the system may reside on any of a variety of devices in the network 1, e.g., network server 20. An exemplary enterprise management system known as the Mobility Services Platform ("MSP") was developed by Symbol Technologies, Inc. of Holtsville, N.Y.

Figure 2:
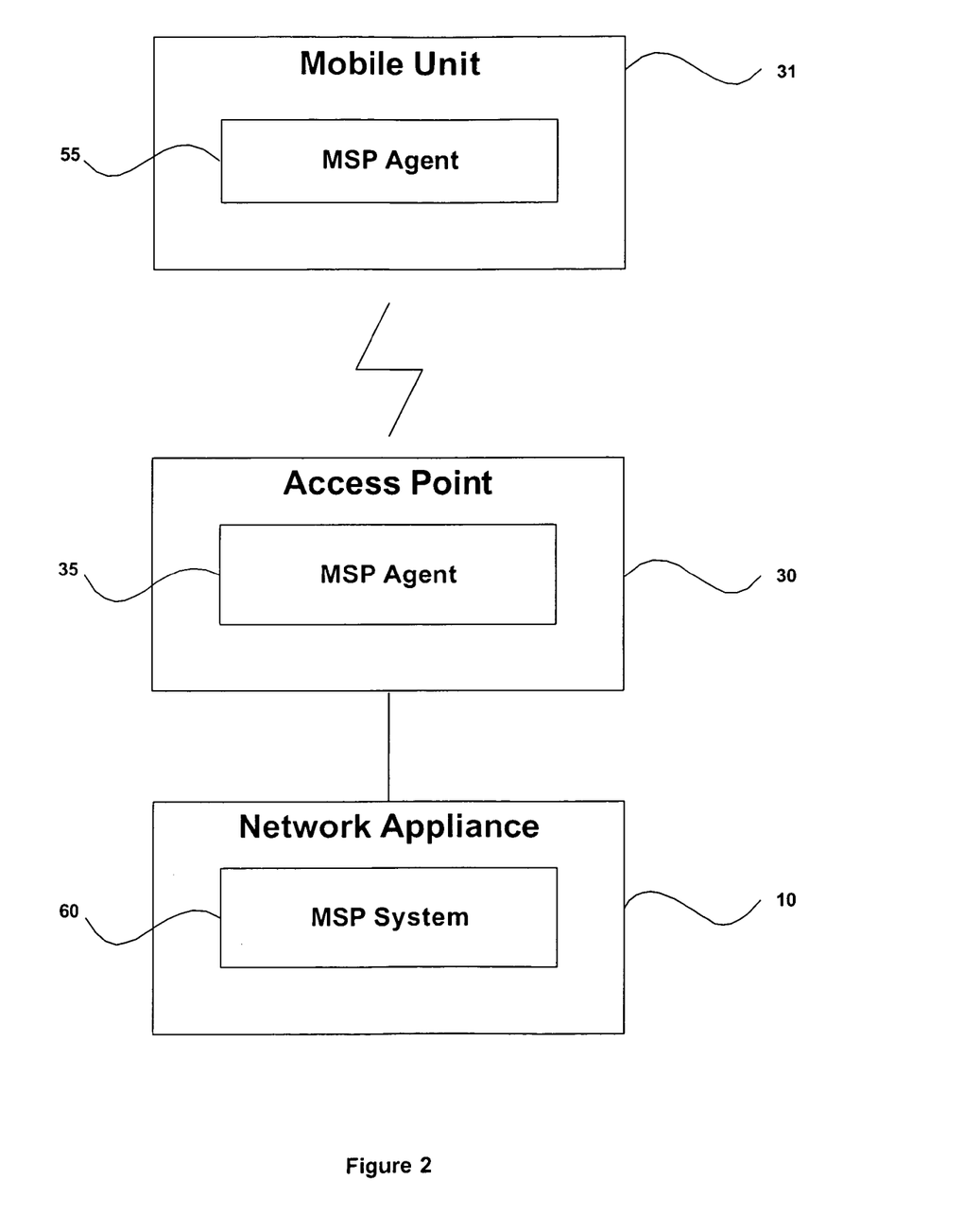
FIG. 2 shows an exemplary portion of the network of FIG. 1.

FIG. 2 shows an exemplary portion of the network 1 and will be used to generally describe the operation of an exemplary enterprise management system. The exemplary network devices shown in FIG. 2 are the network appliance 10, the access point 30 and the mobile unit 31. The network appliance 10 is shown as including the MSP system 60 (e.g., an enterprise management system). This is the system which may be used to monitor, manage and control the network 1. The present invention may be implemented without regard to the specific type of network management system.

The access point 30 and the mobile unit 31 include MSP agents 35 and 55, respectively. The MSP agents 35 and 55 are software components that include functionality for management of the devices by the MSP system 60. An MSP agent will reside on each of the network devices that are managed as part of the MSP system 60. The MSP agent may collect information on the network device and forward the information to the MSP system 60 for the purposes of monitoring and control. The information collected by the MSP agent will depend upon any number of factors such as device type, device functionality, system administrator preferences, etc.

The information that is collected by the MSP agents 35 and 55 is communicated to the MSP system 60 on the network appliance 10. The MSP system 60 may then manage the network devices and/or the entire network 1 using the information provided by the wireless agents 35 and 55. The MSP system 60 manages the network devices and/or the network 1 based on a set of management policies that are provided within the MSP system 60 allowing a network administrator to maintain control of the entire network 1. When the MSP system 60 needs to communicate with or initiate a management or control action on a network device, the MSP system will communicate the MSP agent of the device. The MSP agent will then communicate with the appropriate hardware and/or software component in the device to cause the device to take the desired action.

Thus, as can be seen from the above example, the inclusion of MSP agents on the network devices facilitates the monitoring and management of devices that are connected to the network. Through the wireless agents, the MSP system (and by extension the system administrator) may receive important information concerning all the devices connected to the network, including an inventory of all the network devices.

Figure 3:
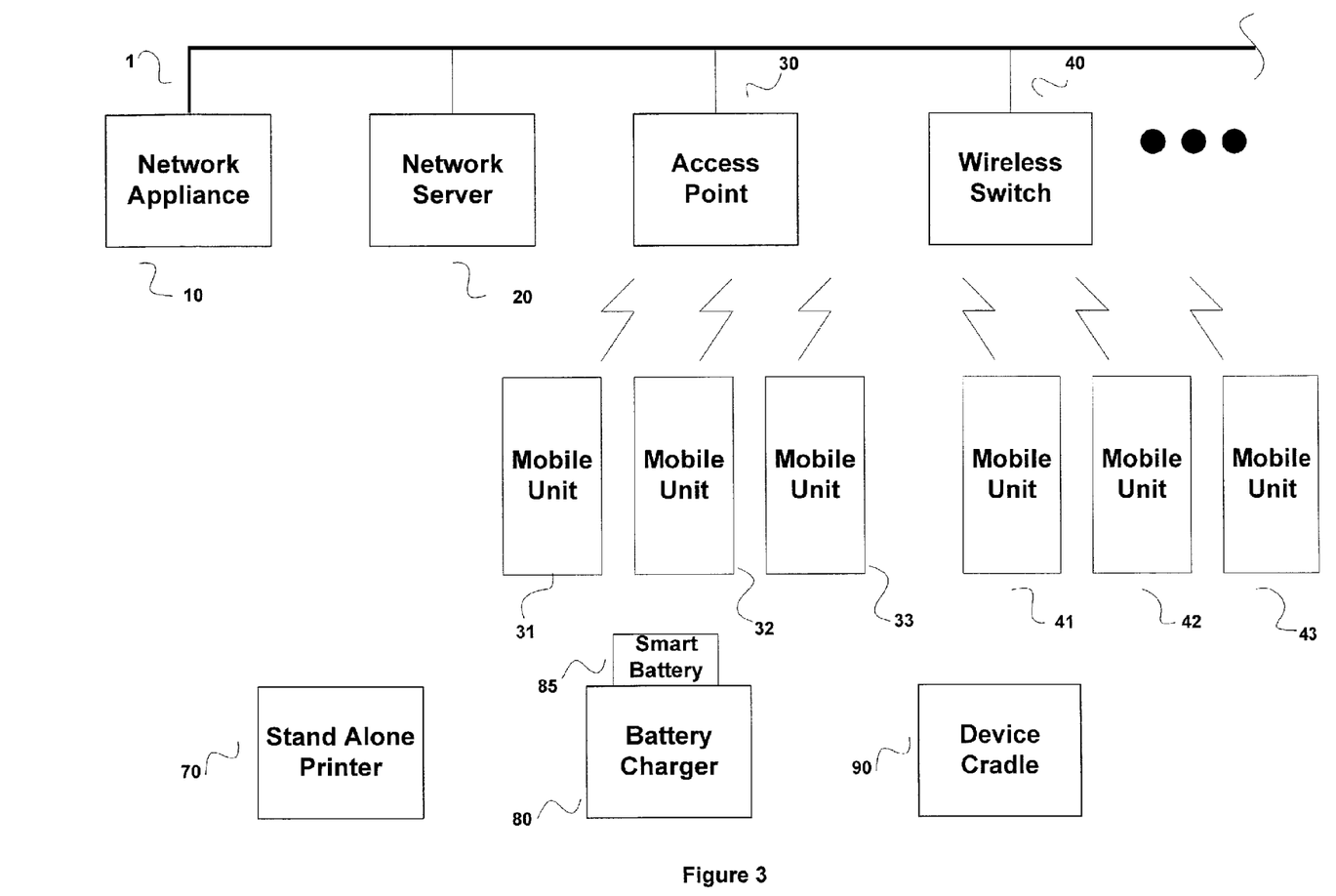
FIG. 3 shows an expanded view of the exemplary network of FIG. 1 which includes an enterprise management system for managing the devices on the network.

FIG. 3 shows an expanded view of the exemplary network 1 of FIG. 1 which includes an enterprise management system for managing the devices on the network. All the devices described with reference to FIG. 1 are included in this view, i.e., network devices, 10, 20, 30-33 and 40-43. However, this expanded view also shows a standalone printer 70, a battery charger 80 and a device cradle 90. In a strict sense, devices 70-90 may not be considered to be part of the network 1 because they are not capable of communicating with other devices on the network 1. However, these devices 70-90 may play a crucial role in the proper operation of the network 1. For example, if the mobile units 31-33 and 41-43 cannot be recharged when their batteries are low, the mobile units 31-33 and 41-43 become useless to the network.

Thus, while these devices 70-90 are not connected to the network 1, they may play an integral role in the proper operation of the network 1. Therefore, it is reasonable to believe that a system administrator would be interested in collecting attributes and monitoring these devices in the same manner as other network devices, e.g., using the MSP system 60. However, since these devices are not connected to the network 1, device attributes cannot be directly sent to the MSP system 60. Those of skill in the art will understand that the devices 70-90 are only exemplary and there may be any number of other devices that are important to the operation of the network, but do not connect to the network.

The exemplary embodiments of the present invention provide for indirect monitoring and inventory of these assets which are not connected to the network. It should be noted that in addition to devices which are not connected to the network, there may also be devices which are connected to the network, but are incapable of hosting an MSP agent, thereby rendering the device invisible to the MSP system. The exemplary embodiments of the present invention may also be applied for such invisible devices. Throughout this description, the term invisible devices will be used to describe both devices that are not connected to the network and devices that are connected, but do not have the capability of communicating information to the MSP system, e.g., no MSP agent.

Figure 4:
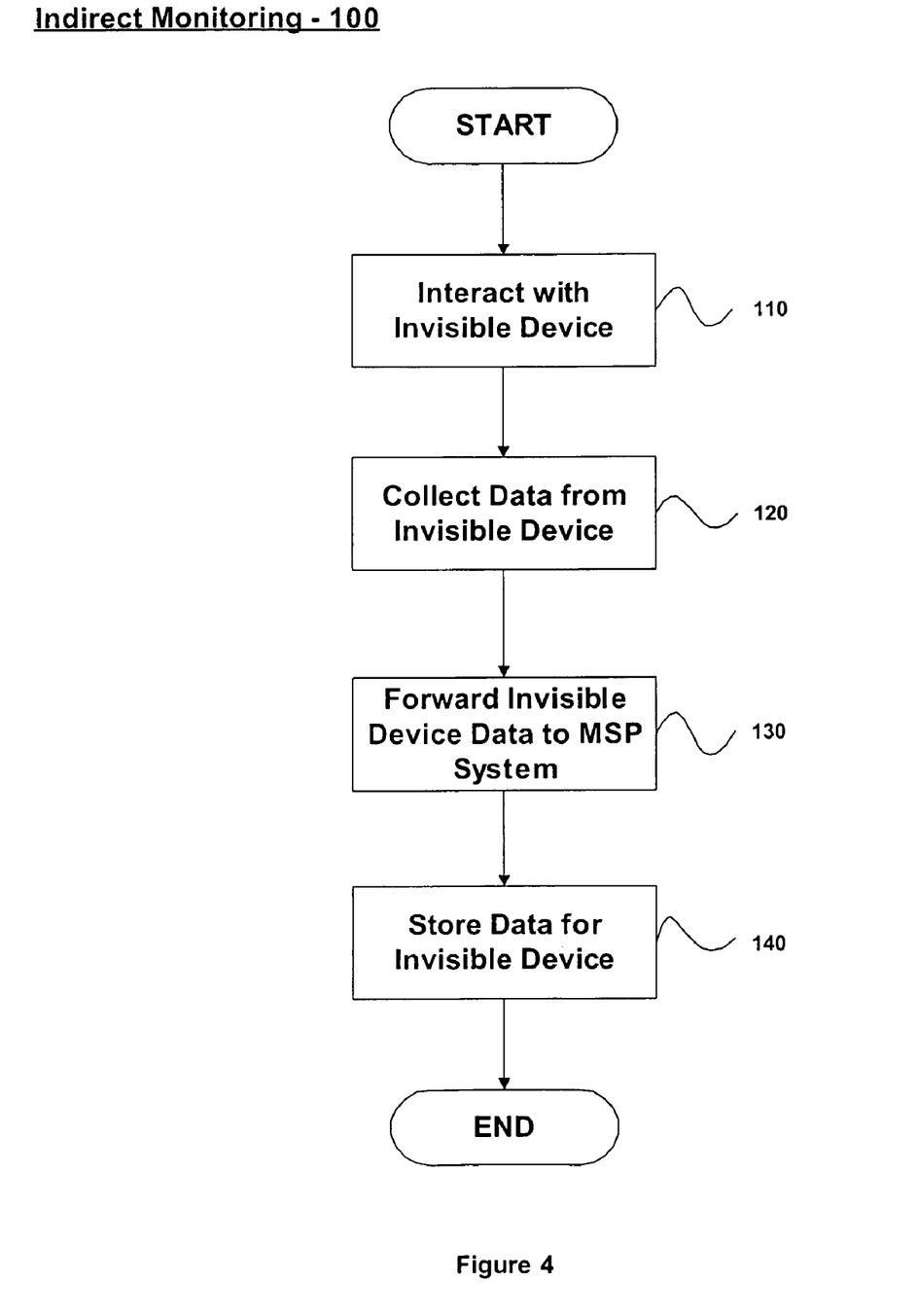
FIG. 4 shows an exemplary method for indirectly monitoring invisible devices according to the present invention.

FIG. 4 shows an exemplary method 100 for indirectly monitoring invisible devices. In step 110, a network device interacts with an invisible device. An example of an interaction is when mobile device 31 communicates with printer 70 in order to download data for printer 70 to print. Other examples of interactions will be provided below.

In step 120, the network device collects information from the invisible device during the interaction. In the example provided above, the mobile unit 31 in its communication with the printer 70 may receive an identifier for the printer 70. Again, additional examples of information collected from invisible devices will be provided below. The MSP agent of the network device may collect and store this information in the same manner as it collects information about the network device itself.

In step 130, the MSP agent will forward the information collected about the invisible device to the MSP system. The information collected by the MSP agent may be tagged as information concerning an invisible (or different) device than the network device associated with the MSP agent so that when the information is forwarded to the MSP system it can be distinguished from the normal network device information.

In step 140, the MSP system stores the information collected about the invisible device. The MSP system may then provide this information to the system administrator. The presentation may be, for example, in an inventory list of devices associated with the network. Those of skill in the art will understand that the additional data on invisible devices may be presented to the system administrator in any number of manners in addition to an inventory list.

Thus, using the exemplary method of the present invention, the system administrator will have a more complete view of the network than just those devices which include MSP agents. The system administrator may use this additional information to more effectively manage the network. For example, if the system administrator is aware that mobile units in a particular location are experiencing a significant number of low battery events and the inventory shows there are few battery chargers at the location, the system administrator may determine that more battery chargers are required at the location.

It should be noted that in the above description, it was referred to that the system administrator will have a more complete view of the network. This refers to the fact that the MSP system (or enterprise management system) will include additional data for these invisible devices, thereby allowing the MSP system to provide more information to the system administrator. This will also allow the system administrator to include more management policies in the MSP system which may depend on the information from the invisible devices.

The following provides several examples of the retrieval and storage of invisible device information. These examples are not exhaustive, but are provided to illustrate several exemplary manners of carrying out the indirect monitoring method 100 described with reference to FIG. 4. Those of skill in the art will understand that there may be any number of other manners of detecting and collecting information from invisible devices in connection with the present invention.

The following examples will be described with reference to the network 1 of FIG. 3 and assuming the arrangement as shown in FIG. 2. In a first example, the discovery of the cradle 90 by the MSP system 60 will be considered. The cradle 90 may provide various services for the mobile units (e.g., mobile unit 31) of the network 1. These services may include network connectivity and/or battery charging services. An exemplary cradle 90 may include a port connector (e.g., Ethernet connector, USB connector etc.) so that the cradle 90 may provide an interface with the network 1. The cradle may also include a pin connector (e.g., 24 pin connector) to interface with the mobile unit 31. By placing the mobile unit 31 into the cradle 90, the mobile unit may establish a wired connection to the network 1 via the pin connector and the port connector of the cradle 90. However, even though the mobile unit 31 is communicating with the network 1 via the cradle 90, the cradle 90 is not communicating with the network. In addition, the cradle 90 will not have the capability to store and run an MSP agent.

In one exemplary embodiment, the cradle 90 may be provided with the capability of communicating with the mobile unit 31, when the mobile unit is placed in the cradle 90. The communication may be as simple as the cradle 90 providing a positive feedback to the mobile unit 31 that it has been correctly placed in the cradle 90. The communication may include a unique identifier for the cradle 90 or any other information that may be stored on the cradle 90.

Those of skill in the art will understand that the cradle 90 may include an integrated circuit chip (or other similar device) which is used for interfacing the mobile unit 31 to the network 1 when the mobile unit is inserted into the cradle 90. Thus, this information (e.g., the unique identifier) may be encoded into the existing integrated circuit chip in the cradle 90 so that it may be communicated to the mobile unit 31. Other manners of including this information in the cradle 90 may include, for example, providing an additional chip or memory in the cradle 90 to store the data. The cradle 90 may also be provided with additional logic to indicate that it should communicate under certain circumstances with the mobile unit 31 (e.g., when the mobile unit 31 is inserted into the cradle) and with additional protocols to allow a communication between the cradle 90 and the mobile unit 31.

As described above, the MSP agent 55 of the mobile unit 31 will receive this information from the cradle 90 and forward the information to the MSP system 60 where the information will be stored. Thus, upon the MSP agent 55 sending the information collected from the cradle 90 to the MSP system 60, the cradle 90 will be included as a device related to the network. Specifically, as described above, the information received from the cradle 90 will be tagged as being from a device other than the device associated with the MSP agent 55 (i.e., mobile unit 31). Therefore, when the MSP system 60 receives this information it will understand that the information is for some invisible device.

If this is the first time the MSP system 60 receives information for this invisible device, the MSP system will create a new entry for this device and store the information in this entry. If the MSP system 60 has previously discovered the invisible device, the receipt of the information will confirm that the invisible device remains associated with the network. The above description implies that the MSP system 60 stores information about devices in a database format. Those of skill in the art will understand that the information may be stored in any manner by the MSP system 60.

In the present example, the cradle 90 communicates a unique identifier to the MSP agent 55 of the mobile unit 31. The purpose of communicating a unique identifier is so that the device may be uniquely identified within the MSP system 60. Those of skill in the art will understand that the network devices such as mobile unit 31-33 and 41-43, network switch 40, access point 30, etc., will have a unique identifier such as an IP address so that MSP system 60 may identify each device. In the same manner, the invisible devices will have some unique identifier. For example, the invisible device may have a unique serial number. Those of skill in the art will understand that there may be other manners of uniquely identifying an invisible device that may include numbers assigned by the manufacturer of the device or a number assigned by the system administrator when it becomes associated with the network 1. The unique identifier may also be any other characteristic or set of characteristics of the invisible device that allows it to be uniquely identified.

Moreover, the cradle 90 may store other types of information beside the unique identifier which can be communicated to the MSP agent 55 for transfer to the MSP system 60. For example, a model number, a type of device, a list of capabilities, etc. Any characteristic which may be of interest to the system administrator.

However, as described above, the cradle 90 may not have the capability to store additional data. In such a case, the MSP system 60 may discover additional information about the cradle 90 in an indirect manner using other network devices. For example, when the MSP system 60 receives a communication for the MSP agent 55 of the mobile unit 31 including the unique identifier of the cradle 90, the MSP system 60 will understand that the mobile unit 31 is in communication with an invisible device. The MSP system 60 may also receive from the MSP agent 55 the location of the mobile unit 31. The MSP system may then use this location as the location of the cradle 90.

Continuing with this example, the MSP system 60 may understand that the mobile unit 31 is communicating with the network 1 using a wired connection. Thus, the MSP system 60 may determine that the cradle 90 includes a characteristic of including a wired interface to the network. The MSP system 60 may also understand that the wired connection is an Ethernet connection and further determine that cradle 90 includes a characteristic of Ethernet connectivity.

A further continuation of the cradle 90 example may include that the MSP system 60 monitors the battery level of the mobile unit 31 via information received from the MSP agent 55. If the MSP system 60 determines that there was a communication with cradle 90 and that the battery level of the mobile unit 31 is increasing, the MSP system 60 may determine that cradle 90 includes battery charging capability and store this as a characteristic of the cradle 90.

In another example, the MSP system 60 may know the type or model number of the mobile unit 31. Thus, the MSP system 60 may infer that the cradle 90 is for use with this type of mobile unit and store that information.

Thus, as can be seen from the above examples, even if the invisible device does not have the capability to store any information beyond a unique identifier, the MSP system 60 may infer certain characteristics of the invisible device. Those of skill in the art will understand that many other types of characteristics may be inferred from the interaction between a network device and an invisible device.

In another example, the case of stand alone printer 70 will be considered, i.e., a printer not connected to the network. In many instances such printer are used by mobile units to print out information stored on the mobile unit. The mobile unit (e.g., mobile unit 31) may communicate with the printer 70 via, for example, a serial connector, a USB connector, infrared ("IrDA"), Bluetooth, etc.

Thus, in the example of printer 70, the mobile unit 31 is already communicating with the printer 70 to send the information for printing and the printer 70 is typically sending an acknowledgment or other information that it is receiving and printing the information. Therefore, these types of invisible devices, may include extra data in the communication to identify the invisible device so that the MSP agent 55 of mobile unit 31 can communicate this data to the MSP system 60. The MSP system 60 may then store this data and include the printer 70 as associated with the network 1.

Other information about the printer 70 may be collected directly or indirectly as described above in the example of cradle 90, e.g., ink level, paper level, etc. For example, the mobile unit 31 may provide the MSP system 60 with information such as the number of pages it printed on the printer

70. This information could be aggregated with information sent by other mobile units that used printer 70 to provide a more complete picture of the history of printer 70. Thus, the MSP system 60 may provide data aggregation for a particular invisible device, where the data is from several sources.

Other examples of devices which already communicate with the mobile unit 31 may include, for example, magnetic stripe readers, modem interfaces, etc. In these examples, the communication that will be sent to the mobile unit 31 may be augmented to include an identifier so that the MSP system 60 may uniquely identify the device.

However, the example of printer 70 may also show an example of providing a unique identity to a device without the device providing a unique identifier. For example, the MSP agent 55 of mobile unit 31 may collect information that the mobile unit 31 is sending print information via its infrared port, e.g., an infrared printer driver has been invoked by the OS of the mobile unit 31. The MSP system 60 may receive this information and infer that there is a printer within infrared range of the mobile unit 31. The MSP system 60 may determine the location of the mobile unit 31 (from information received from the MSP agent 55) and determine if it has previously stored any information for a printer at that location, plus a radius for infrared range. If there is no such device, the MSP system 60 may assume that this is a new device and may then assign a unique identifier to this printer and store it as associated with the network 1. If the MSP system 60 indicates that it already knows of a printer in the area, the MSP system 60 may use this as a confirmation that the device exists. Thus, even if the device does not communicate a unique identifier, the MSP system 60 may be able to infer a unique device by the characteristics of the operation of the mobile unit 31 (e.g., printing and location) so that the MSP system 60 may assign a unique identifier to the printer 70.

When the MSP system 60 uses this type of inferential method of uniquely identifying an invisible device, it may also provide a prompt to the user of the mobile unit 31 to confirm the identification. For example, the mobile unit 31 may display a message from the MSP system which states "please confirm that this device was just used to print to a stand alone printer Y/N," or other similar message. A response to this message will provide the MSP system 60 with feedback to determine if its inferential determination was correct. Any other inferential determination may also be accompanied by a request to the user to confirm the determination. The system administrator may decide when, and if, such requests are appropriate.

The information collected about the invisible devices may be used for more than just inventory of invisible devices, but may be used to better manage the network. For example, the MSP system 60 may receive messages from MSP agents of multiple mobile units indicating that they are using the printer 70 to print. This usage pattern may be used to manage the network. An example may be that the MSP system 60 may estimate when the printer 70 needs new toner or paper. In another example, the MSP system 60 may determine that the printer 70 is being underutilized and that it should be moved to a different location. In a further example, the MSP system 60 may show that the mobile unit of the average user of the printer 70 moves 100 feet before printing. This may indicate that the printer 70 should be moved or that more printers should be placed at strategic points in the operating area.

These types of determinations based on usage data of invisible devices may be made by management policy implemented in the MSP system 60 (e.g., after 4,500 pages of print, provide an automatic indication that a new box of paper should be delivered to the printer 70) or by a system administrator reviewing the usage records for various invisible devices. Those of skill in the art will understand that there are numerous types of usage data that may be collected on various invisible devices and that this data may be used to fire any number of automatic management polices of the MSP system 60 or provide general data to the system administrator.

Another example of an invisible device that may be tracked by the MSP system 60 is a smart battery. It is common for smart batteries to include a unique identifier. Thus, when a smart battery is inserted into a device (e.g., a mobile unit), the smart battery may communicate its identity to the mobile unit and its MSP agent. This information may then be sent to the MSP system 60 and information about the particular smart battery may be stored (e.g., the device into which the battery was placed). By tracking the movements of various smart batteries from device to device, the MSP system 60 may be used to gain an understanding of how batteries are used across the network 1.

In the next example, the case of the battery charger 80 will be considered. In a first example, the battery charger may have the capability of charging a stand alone battery (e.g., a smart battery 85, as shown in FIG. 4). When the smart battery 85 is placed in the battery charger 80, it may send a unique identifier to the smart battery 85. When the smart battery 85 is later placed into a device, the smart battery 85 may send this information to the MSP agent of the device and this information may be forwarded to the MSP system 60, thereby allowing the battery charger to be discovered by the MSP system 60.

In another example, the battery charger 80 may not be able to communicate with a network device. However, the battery charger 80 may include some unique identifier which could be obtained by the network device. For example, the battery charger 80 may include a bar code or RFID tag which could be read by the network device (e.g., mobile unit 31). This information could then be sent to the MSP system 60 so the battery charger 80 may be identified as being associated with the network.

Again, user prompts may be helpful to facilitate this type of discovery. For example, if the MSP system 60 determines that the battery level of the mobile unit 31 is increasing, it may infer that it is connected to a battery charger. When the battery is fully charged or when the mobile unit 31 begins to move again, the user may be prompted to scan the battery charger to which the mobile unit 31 was previously connected. The user may then scan the battery charger 80 using an appropriate device (e.g., bar code scanner, imager, RFID reader, etc.), thereby allowing the MSP system 60 to discover the to the battery charger 80.

In each of the above examples, the network devices used to discover the invisible devices were mobile units. This will be the typical case because the mobile units will generally have the most interaction with invisible devices. However, the present invention is not limited to discovering invisible devices with mobile units. Other network devices may be used to discover invisible devices.

The present invention has been described with the reference to the above exemplary embodiments. One skilled in the art would understand that the present invention may also be successfully implemented if modified. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising:
   receiving, on a first device connected to a network, a communication including information corresponding to a second device which is not connected to the network;
   storing the information on the first device; and
   transmitting the stored information to an enterprise management system for the network, wherein the information includes an indication that the information corresponds to the second device, wherein the first device includes an enterprise management agent permitting the first device to interact with another device connected to the network, and wherein the indication indicates that the second device does not include the enterprise management agent.

2. The method of claim 1, wherein the receiving, storing and transmitting are executed by an agent of the enterprise management system on the first device.

3. The method of claim 1, wherein the first device is a mobile unit.

4. The method of claim 1, wherein the second device is one of a printer, a battery charger, a smart battery, and a cradle.

5. The method of claim 1, wherein the information includes a unique identifier.

6. A device, comprising:
   a protocol to communicate with other network devices on a network; and
   an enterprise management agent to receive information corresponding to a non-network device which is not connected to the network, store the information corresponding to the non-network device and transmit the stored information using the protocol to an enterprise management system on one of the other network devices, wherein the information indicates that the non-network device does not include the enterprise management agent.

7. The device of claim 6, wherein the information is transmitted with an indication that it corresponds to the non-network device.

8. The device of claim 6, wherein the device is a mobile unit.

9. The device of claim 6, wherein the non-network device is one of a printer, a battery charger, a smart battery, and a cradle.

10. The device of claim 6, wherein the information includes a unique identifier.

11. A method, comprising:
    receiving a communication from an agent residing on a network device, the communication including information corresponding to a non-network device which is not connected to the network;
    storing the information for the non-network device; and
    transmitting the information to a server, wherein the information includes an indication that the information corresponds to the non-network device and that the non-network device does not include an enterprise management agent.

12. The method of claim 11, further comprising:
    providing an inventory list to a user, the inventory list including the network device and the non-network device.

13. The method of claim 11, wherein the information includes a unique identifier.

14. The method of claim 11, further comprising the step of:
    determining additional information for the non-network device based on data received for the network device.

15. The method of claim 14, wherein the wherein the data includes an operation of the network device.

16. An enterprise management system, comprising:
    a receiving module to receive a communication from an agent residing on a network device, the communication including information corresponding to a non-network device which is not connected to the network; and
    a storage module to store the information for the non-network device, wherein the information includes an indication that the non-network device does not include the agent.

17. The enterprise management system of claim 16, further comprising:
    an inventory module to provide an inventory list to a user, the inventory list including the network device and the non-network device.

18. The enterprise management system of claim 16, wherein the information for the non-network device includes an indication that the information corresponds to the non-network device.

19. The enterprise management system of claim 16, wherein the information includes a unique identifier.

20. The enterprise management system of claim 16, further comprising:
    an analyzation module to determine additional information for the non-network device based on data received for the network device.

21. The enterprise management system of claim 20, wherein the wherein the data includes an operation of the network device.

22. The enterprise management system of claim 16, further comprising:
    a prompting module to send a prompt to the agent, wherein the prompt includes a request for a user of the network device.

* * * * *

UNITED STATES PATENT AND TRADEMARK OFFICE
CERTIFICATE OF CORRECTION

| | | |
|---|---|---|
| PATENT NO. | : 7,567,812 B2 | Page 1 of 1 |
| APPLICATION NO. | : 11/191637 | |
| DATED | : July 28, 2009 | |
| INVENTOR(S) | : Herrod et al. | |

It is certified that error appears in the above-identified patent and that said Letters Patent is hereby corrected as shown below:

In Column 10, Line 16, in Claim 15, delete "wherein the wherein the" and insert -- wherein the --, therefor.

In Column 10, Line 44, in Claim 21, delete "wherein the wherein the" and insert -- wherein the --, therefor.

Signed and Sealed this

Sixteenth Day of February, 2010

David J. Kappos
*Director of the United States Patent and Trademark Office*